United States Patent Office 3,155,679
Patented Nov. 3, 1964

3,155,679
5,5'-THIOBIS(ISOTHIAZOLE) COMPOUNDS
AND THEIR PRODUCTION
William R. Hatchard, Wilmington, Del., assignor to E. I.
du Pont de Nemours and Company, Wilmington, Del.,
a corporation of Delaware
No Drawing. Filed July 27, 1962, Ser. No. 213,010
9 Claims. (Cl. 260—302)

This invention relates to the isothiazole derivatives and their preparation.

Compounds having the isothiazole structure, i.e., the structure

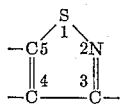

(the ring atoms are numbered for easier reference) have been unknown until recently except in the form of bicyclic compounds where the isothiazole nucleus is fused to a benzene nucleus, i.e., benzoisothiazoles. It was only in 1956 that isothiazoles wherein the ring carbon atoms bear monovalent substituents were first reported by Adams and Slack (Chemistry and Industry, 1956, 1232). Little is known of the chemistry of isothiazoles. In particular, no compounds having two isothiazole nuclei joined by sulfide or disulfide linkages, i.e., bisisothiazole sulfides or disulfides, have been reported.

The new compounds made available by this invention are the 5,5' - mono- and dithiobis(3 - haloisothiazoles) wherein the halogen atoms are chlorine or bromine and the carbon atom in the 4-position of each isothiazole nucleus is attached to a cyano group or to a group resulting from the hydrolysis of said cyano group.

There compounds are represented by the general formula (I)
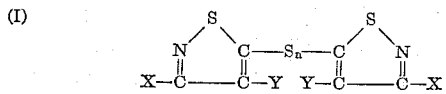

where $n$ is 1 or 2; X is chlorine or bromine; and Y is the cyano group, —CN, or a group resulting from its hydrolysis, i.e., carbamoyl (—CONH$_2$) or carboxyl (—COOH). For the sake of brevity, these compounds will sometimes be referred to hereinafter as bisisothiazole sulfides.

The products of this invention may be prepared by the methods described below.

The 5,5'-thiobis(3-halo-4-isothiazolecarbonitriles), i.e., the compounds of Formula I where Y is the cyano group and $n=1$ may be prepared by reacting a 3,5-dihalo-4-isothiazolecarbonitrile with an alkali metal thiocyanate in an inert organic medium which is at least a partial solvent for the reactants. The mechanism of this reaction is not fully understood, but the process can be formally depicted by the partial equation:

(1)
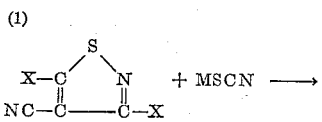

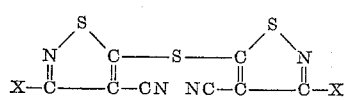

where X is a halogen of atomic number 17–35, and preferably chlorine, and M is an alkali metal of atomic number 11–19 (sodium or potassium), and preferably sodium.

In this method, the relative proportions of the two reactants are not critical. It is not at all essential to use the reactants in the molar ratio shown in Equation 1. On the contrary, the alkali metal thiocyanate can be used in mole ratios either lower or higher than 0.5:1, for example, in a mole ratio, relative to the 3,5-dihalo-4-isothiazolecarbonitrile, between 0.4:1 and 1.5:1, although there is no advantage in exceeding about 1:1.

The reaction is conducted in an organic liquid diluent capable of dissolving the reactants to at least some extent, e.g., at least 1% by weight. The nature of the solvent is not critical, and thus any inert organic solvent can be used. Typical solvents are alkanols such as methanol, ethanol or isopropyl alcohol; ketones such as acetone or methyl ethyl ketone; ethers such as di-n-butyl ether, 1,2-dimethoxyethane, dioxane or tetrahydrofuran; carboxylic acid esters such as ethyl acetate or methyl benzoate; and the like. The reaction medium need not be anhydrous, and the presence of some water, although not essential, may even be beneficial. The amount of reaction medium is immaterial as long as there is enough of it to maintain the reaction fluid and some of each reactant in solution.

The reaction can proceed at a temperature as low as 0° C. but more practical reaction rates are obtained on moderate heating, e.g., at an external temperature in the range of 50–100° C. Higher temperatures can be used if desired but there is no advantage in exceeding about 150° C.

The recation product can be isolated by any convenient procedure, such as evaporation of the solvent, with or without prior removal of the inorganic salts by filtration, and extraction of the residue with a suitable organic solvent.

The 5,5'-thiobis(3-halo-4-isothiazolecarboxamides), i.e., the compounds of Formula I where Y is the carbamoyl group and $n=1$, can be prepared by subjecting the corresponding nitriles to acid hydrolysis according to known methods. Preferably, sulfuric acid of 90–97% concentration is used at temperatures in the range of 10–100° C. for a period which, depending on the temperature, can vary from a few minutes to 24 hours. The resulting product is conveniently isolated by diluting the reaction mixture with a large volume of cold water.

Alternatively, the 5,5'-thiobis(3-halo-4-isothiazolecarboxamides) can be prepared by reacting a 3,5-dihalo-4-isothiazolecarboxamide with an alkali metal thiocyanate using the conditions described above with respect to the reaction of 3,5-dihalo-4-isothiazolecarbonitriles. Thus, the method which may be employed to directly prepare the 5,5'-thiobis(3 - halo-4 - isothiazolecarboxamides and -carbonitriles) of this invention can be represented by the partial equation (2)
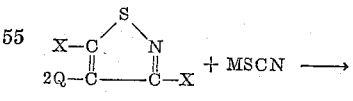

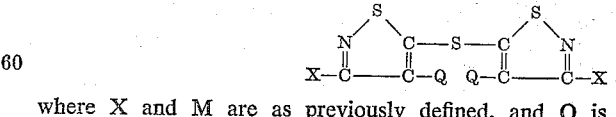

where X and M are as previously defined, and Q is —CN or —CONH$_2$.

The 5,5'-thiobis(3 - halo-4 - isothiazolecarboxylic) acids (Y=COOH, $n=1$ in Formula I) can be prepared from the corresponding carboxamides by hydrolysis with nitrous acid in sulfuric acid according to known methods. This can be done by dissolving the carboxamide in 90–97% sulfuric acid and adding a slight to moderate molar excess of sodium nitrite dissolved in a little water, the operation being conducted at a low temperature (0–10° C.), followed by warming, up to about 100° C., for a brief period.

The resulting acid can be isolated by pouring the reaction mixture in cold water.

The 5,5'-dithiobis(3-halo-4-isothiazolecarbonitriles), i.e., the compounds of Formula I where Y is the cyano group and $n=2$, may be prepared by treating an alkali metal salt of a 3-halo-5-mercapto-4-isothiazolecarbonitrile with a mild oxidizing agent capable of converting a thiol linkage to a disulfide linkage. This reaction is represented by the following equation, using iodine as an illustrative typical oxidizing agent:

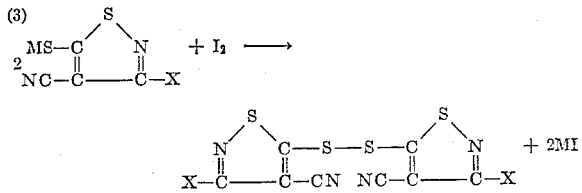

In this equation, M is an alkali metal of atomic number 11–19, preferably sodium, and X is a halogen of atomic number 17–35, and preferably chlorine. Other oxidizing agents known to be effective in converting a thiol to a disulfide and therefore suitable for use in this reaction include oxygen itself, hydrogen peroxide, ferric chloride, lead peroxide, cupric sulfate, potassium ferricyanide, sulfur dioxide, sulfuryl chloride, and thionyl chloride. Iodine, oxygen and hydrogen peroxide are preferred oxidizing agents.

The alkali metal salt of the 3-halo-5-mercapto-4-isothiazolecarbonitrile is prepared by reacting, in a molar ratio of approximately 1:1, an alkali metal sulfide and a 3,5-dihalo-4-isothiazolecarbonitrile. This reaction is conveniently conducted in an inert organic liquid medium. The solvents mentioned for the preparation of the monosulfides are suitable for this reaction also, a preferred class of solvents being the lower alkanols, especially methanol and ethanol. Some water is desirably present to help dissolve the alkali metal sulfide. A reaction temperature in the range of 0–100° C., preferably 30–75° C., is suitable.

It is neither necessary nor advantageous to isolate the resulting alkali metal mercaptide, which is somewhat unstable in the dry state. The reaction medium for the oxidation step can be the same as that used in preparing the alkali metal mercaptide, or it can be modified by addition of a better solvent (aqueous or organic) for the oxidizing agent. The subsequent oxidation reaction is then conducted directly in this reaction medium, to which the oxidizing agent is added in an amount which is not critical but which, for complete utilization of the organic material, should be at least stoichiometrically sufficient to remove all of the metal from the mercaptide. A moderate excess, e.g., up to about 25%, can be used but larger excesses may cause side reactions in some cases and are not generally recommended. The oxidation proceeds at an external temperature which may be as low as 0° C.; mild heating may be used with the less active oxidizing agents, but it is generally unnecessary to exceed about 100° C., a temperature near room temperature, e.g., in the range of 10–40° C., being usually most suitable. The resulting 5,5'-dithiobis(3-halo-4-isothiazolecarbonitrile) generally separates from the reaction medium as it forms. If not, the solvent can be partly or wholly evaporated and the product can be crystallized from the residual solution or extracted from the residual solid.

The 5,5'-dithiobis(3-halo-4-isothiazolecarboxamides) and the corresponding carboxylic acids are prepared from the carbonitriles by the acid hydrolysis procedures already described in connection with the corresponding monosulfides.

The starting materials in the processes described above are 3,5-dichloro-4-isothiazolecarbonitrile and 3,5-dibromo-4-isothiazolecarbonitrile. These compounds are prepared by reacting an alkali metal mercaptide of 2,2-dicyano-1,1-dimercaptoethylene with chlorine or bromine, in accordance with the equation

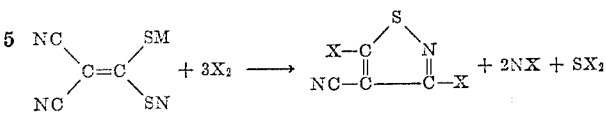

where M is sodium or potassium and X is chlorine or bromine. Typical preparations are given below for illustrative purposes.

(A) *3,5-dichloro-4-isothiazolecarbonitrile.*—Chlorine gas was rapidly passed into a mixture of 110 g. of 2,2-dicyano-1,1-disodiomercaptoethylene in 800 ml. of carbon tetrachloride for 2 hours. Heat evolution quickly heated the mixture to reflux for the first hour but during the second hour the reaction mixture cooled to about 40° C. The reaction mixture was filtered, the residue was washed with carbon tetrachloride and the combined filtrate and washes were concentrated by distillation of the carbon tetrachloride. The distillation residue was subjected to steam distillation to give 60 g. (57% yield) of a white solid distillate, M.P. 64–65° C., consisting of essentially pure 3,5-dichloro-4-isothiazolecarbonitrile.

(B) *3,5-dibromo-4-isothiazolecarbonitrile.*—To a stirred slurry of 37.2 g. (0.2 mole) of 2,2-dicyano-1,1-disodiomercaptoethylene in 400 ml. of carbon tetrachloride was added dropwise at room temperature 64 g. (0.4 mole) of bromine. The temperature of the reaction mixture rose to 30° C. during the addition (30 minutes). After being stirred another 75 minutes while being heated to 40–55° C., the reaction mixture was filtered and the filtrate was concentrated by rapid distillation at atmospheric pressure under a short column. The liquid residue (2.3 g.) was subjected to distillation at reduced pressure through a small still head. This removed a small quantity of a red liquid, B.P. 40–45° C. at 1 mm., which was presumably sulfur monobromide. White crystals sublimed into the still head. This solid was collected and resublimed twice at 70° C. and 1 mm. pressure to give crystals of 3,5-dibromo-4-isothiazolecarbonitrile, M.P. 98.3–98.6° C.

The 2,2-dicyano-1,1-disodiomercaptoethylene used as the starting material in the above preparations may be prepared and isolated by the following modification of the procedure described in U.S. Patent 2,533,233.

Malononitrile (66 g., 1 mole) was added slowly to a suspension of 80 g. (2 moles) of sodium hydroxide in 900 ml. of 95% alcohol while the temperature of the mixture was maintained below 40° C. Then carbon disulfide (76 g., 1 mole) was added dropwise with cooling over a period of 30 minutes. The heavy, yellow slurry was stirred an additional hour at room temperature and filtered. The yellow residue was triturated in alcohol, collected on a filter and dried in a vacuum oven at 80° C./1 mm. for 24 hours. There was obtained 180 g. (98% yield) of 2,2-dicyano-1,1-disodiomercaptoethylene.

The potassium salt can be prepared in the same manner and it is equally suitable.

The 3,5-dihalo-4-isothiazolecarbonitriles can be converted to the corresponding carboxamides by acid hydrolysis. An illustrative preparation is as follows:

(C) *3,5-dichloro-4-isothiazolecarboxamide.* — Fifteen grams of 3,5-dichloro-4-isothiazolecarbonitrile was dissolved in 16 ml. of concentrated sulfuric acid and 4 ml. of water. The mixture was heated on the steam bath for 20 minutes, allowed to stand overnight at room temperature, again heated on the steam bath for 30 minutes and then poured into ice water. The precipitated solid was collected and subjected to sublimation at 80–90° C. and 1 mm. to give as a sublimate 6.6 g. of unreacted starting material, M.P. 61.5–64° C. The sublimation residue after recrystallization from methanol yielded 7.0 g. (75% yield) of white crystals, M.P. 160–163° C., of 3,5-dichloro-4-isothiazolecarboxamide,

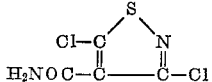

An analytical sample recrystallized from methanol melted at 168-168.5° C.

The following examples illustrate the compounds of this invention. Their use as foliar fungicides is also described below in greater detail.

EXAMPLE I

*5,5'-Thiobis(3-Chloro-4-Isothiazolecarbonitrile)*

A mixture of 3.58 g. (0.02 mole) of 3,5-dichloro-4-isothiazolecarbonitrile, 1.62 g. (0.02 mole) of sodium thiocyanate and 50 ml. of methanol was heated at reflux for about 16 hours and then evaporated to dryness. The residue was extracted with methylene chloride, and the solvent was evaporated from the extract to give 2.0 g. of orange material. This solid was triturated with a benzene-petroleum ether mixture, the insoluble, orange-colored fraction was removed by filtration, and the filtrate was concentrated and then cooled. This gave 1.4 g. (44% yield) of 5,5'-thiobis(3-chloro-4-isothiazolecarbonitrile),

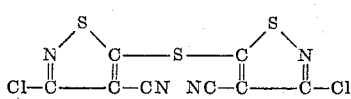

as crystals melting at 129–132° C. An analytical sample purified by sublimation melted at 135–135.5° C.

*Analysis.*—Calc'd for $C_8Cl_2N_4S_3$: C, 30.10; N, 17.55. Found: C, 30.59; N, 17.48.

The ultraviolet spectrum of a methylene chloride solution showed absorption maxima at 276 m$\mu$ ($\epsilon$=16,200) and 3.5m$\mu$ ($\epsilon$=2900). The infrared spectrum showed absorption bands at 4.45$\mu$ (conj. CN), 6.7$\mu$ (conj. C=C and/or CN), 7.4$\mu$ and 7.5$\mu$ (isothiazole).

Another preparation under similar conditions except that the reaction medium was acetone gave the same product in 77% yield.

5,5'-thiobis(3-bromo-4-isothiazolecarbonitrile) can be obtained in the same manner, starting with 3,5-dibromo-4-isothiazolecarbonitrile.

When Example I is repeated using 3,5-dichloro-4-isothiazolecarboxamide instead of 3,5-dichloro-4-isothiazolecarbonitrile as the starting material, 5,5'-thiobis(3-chloro-4-isothiazolecarboxamide) will be obtained. 5,5'-thiobis(3-bromo-4-isothiazolecarboxamide) can be prepared in the same manner by using 3,5-dibromo-4-isothiazolecarboxamide as the starting material.

An alternative method of preparing 5,5'-thiobis(3-halo-4-isothiazolecarboxamides) of this invention is described in the following example.

EXAMPLE II

*5,5'-Thiobis(3-Chloro-4-Isothiazolecarboxamide)*

A solution of 5,5'-thiobis(3-chloro-4-isothiazolecarbonitrile) in concentrated sulfuric acid was heated to 95–100° C. for 30 minutes. After cooling, the reaction mixture was poured onto ice. The resulting water-insoluble material was 5,5'-thiobis(3-chloro-4-isothiazolecarboxamide),

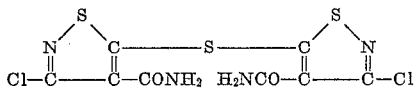

obtained as a white solid that melted at 235°–236° C. An analytical sample was recrystallized from methanol.

*Analysis.*—Calc'd for $C_8H_4Cl_2O_2N_4S_3$: C, 27.03; H, 1.14; N, 15.77. Found: C, 26.63; H, 1.23; N, 15.95.

The ultraviolet spectrum of an ethanol solution showed absorption maxima at 270 m$\mu$ ($\epsilon$=15,400) and 220 m$\mu$ ($\epsilon$=16,500).

EXAMPLE III

*5,5'-Dithiobis(3-Chloro-4-Isothiazolecarbonitrile)*

A solution in 40 ml. of methanol of 3.58 g. (0.02 mole) of 3,5-dichloro-4-isothiazolecarbonitrile was added to a solution of 4.8 g. (0.02 mole) of sodium sulfide nonahydrate in a mixture of 10 ml. of water and 100 ml. of methanol over a period of 15 minutes at 45° C. The reaction mixture was stirred for an additional hour and then cooled to 15° C. To the cooled and stirred mixture, containing the sodium salt of 3-chloro-5-mercapto-4-isothiazolecarbonitrile, was added 2.54 g. (0.01 mole) of iodine and stirring was continued for 1 hour at room temperature. A precipitate formed rapidly after addition of iodine. This precipitate was filtered from the reaction mixture. There was thus obtained 1.61 g. (46% yield) of light yellow crystals, M.P. 128–125° C., of 5,5'-dithiobis(3-chloro-4-isothiazolecarbonitrile),

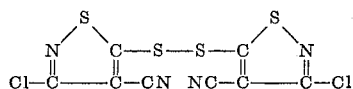

After recrystallization from a benzene-petroleum ether mixture, this product melted at 138-139.5° C.

*Analysis.*—Calc'd for $C_8Cl_2N_4S_4$: C, 27.35; N, 15.96. Found: C, 27.94; N, 15.33.

The infrared spectrum showed absorption bands at 4.5$\mu$ (CN), 6.72$\mu$ (conj. C=CN), and 7.5$\mu$ (isothiazole).

5,5'-dithiobis(3-bromo-4-isothiazolecarbonitrile) can be prepared in the same manner, starting with 3,5-dibromo-4-isothiazolecarbonitrile.

EXAMPLE IV

*5,5'-Dithiobis(3-Chloro-4-Isothiazolecarboxamide)*

A solution of 5,5'-dithiobis(3-chloro-4-isothiazolecarbonitrile) in concentrated sulfuric acid was allowed to stand at room temperature for about 16 hours. It was then poured onto ice. Filtration of the aqueous mixture gave white crystals, M.P. 227–229° C., of 5,5'-dithiobis(3-chloro-4-isothiazolecarboxamide),

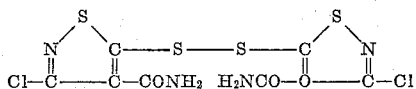

*Analysis.*—Calc'd. for $C_8H_4Cl_2N_4O_2S_4$: C, 24.81; H, 1.04; N, 14.47. Found: C, 25.39; H, 1.00; N, 14.23.

Other products of this invention are 5,5'-thiobis(3-chloro-4-isothiazolecarboxylic acid) and 5,5'-dithiobis(3-chloro-4-isothiazolecarboxylic acid), and the corresponding bromo compounds. These products can be prepared from the corresponding carboxamides by hydrolysis with nitrous acid in acidic medium, as already described. The carboxylic acids, in turn, can be converted to typical derivatives, such as esters and salts, by reaction with alcohols or bases.

As already mentioned, the compounds of this invention are generically useful as foliar fungicides, especially for the control of apple scab. Fungicidal control is obtained in most instances by applying the active compound (i.e., one of the bisisothiazole sulfides of this invention) at a dosage or rate from about 0.05 to 5 pounds in 100 gallons of water and spraying to run-off, the optimum amount within this range being largely dependent upon the variables mentioned hereafter. It is, of course, determined by and dependent upon the particular fungicidal compound selected, the method of application, the state and condition of growth of the vegetation to be treated, and the climatic conditions.

The fungicidal compositions of this invention contain, in sufficient amount to exert fungicidal action, one or more of the above-described active compounds in admixture with a carrier material or conditioning agent of the kind used and commonly referred to in the art as a fungicide adjuvant or modifier. The conventional fungicide adjuvants are inert solids, hydrocarbon liquid diluents and surface-active agents. They provide formulations adapted for ready and efficient application using conventional applicator equipment. Usually from about 1 to 95% by weight of the fungicidal composition is active ingredient.

Solid compositions are preferably in the form of powders. They are compounded to be homogeneous powders that can be either used as such, diluted with inert solids to form dusts, or suspended in a suitable liquid medium for spray application. The powders usually comprise active ingredient admixed with minor amounts of conditioning agent. Natural clays, either adsorptive such as attapulgite or relatively non-adsorptive such as kaolin clays, diatomaceous earth, walnut shell flour, tobacco dust, redwood flour, synthetic fine silica, calcium silicate and other inert solid carriers of the kind conventionally employed in powder fungicidal compositions can be used. The active ingredient usually makes up from about 25 to 80% of these powder compositions. For conversion of the powders to dusts, talc, pyrophyllite, tobacco, dust, volcanic ash and other dense, rapid-settling inert solids customarily are used.

Liquid compositions employing one or more of the fungicidally-active ingredients are prepared by admixing the active ingredient with a suitagle liquid diluent medium. The active ingredient can be either in solution or in suspension in the liquid medium. Typical of the liquid media commonly employed as fungicide adjuvants are kerosene, Stoddard solvent, xylene, alcohols, alkylated naphthalene and glycols. The active ingredient usually makes up from about 0.5 to 50% of these liquid compositions. Some of these compositions are designed to be used as such, and others to be extended with large quantities of water.

Compositions in the form of wettable powders or liquids in many cases also include one or more surface-active agents such as wetting, dispersing or emulsifying agents. These materials causes the compositions to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth by John W. McCutcheon in "Detergents and Emulsifiers . . . Up to Date 1962," John W. McCutcheon, Inc., Morristown, New Jersey.

In some cases it may be desirable to employ the active compounds of the present invention in combination with other fungicides to give compositions that have broad spectrum fungicidal activity. In these mixtures, the fungicidally active materials can be present in any desired amount, ordinarily from about 0.1–20 parts by weight of a compound represented by Formula I per part by weight of the auxiliary fungicidally active material. In some instances it may even be desirable to employ two or more auxiliary fungicides.

Typical of the auxiliary fungicides that can be employed in combination with the compounds of the present invention are the following:

Tetramethyl or tetraethyl thiuram disulfide
Sodium, manganese, ferric, or zinc ethylene-bisdithiocarbamate
Ferric dimethyl dithiocarbamate
Sulfur
2,4-dinitro-6-(1-methylheptyl)phenylcrotonate The fungicides of this invention or the fungicidal mixtures described above containing a fungicide of this invention can also be advantageously mixed with an insecticide. In this way both treatments can be applied at once with a resulting time and labor saving. Typical of the insecticides that can be so mixed are:

1,1,1-trichloro-2,2,-bis(p-chlorophenyl)ethane
o,o-Dimethyl-S-[4-oxo-1,2,3-benzotriazin-3-(4H)-yl-methyl]phosphorodithioate
1,2,3,4,10,10-hexachloro-6,7,-epoxy-1,4,4a,5,6,7,8,8a-octahydro-1,4-endo,exo-5,8-dimethanonaphthalene
4,4'-dichloro-α-trichloromethylbenzhydrol
S-[1,2-bis(ethoxycarbonyl)ethyl]-O,O-dimethylphosphorodithioate
1,1,1-trichloro-2,2-bis(p-methoxyphenyl)ethane
O,O-diethyl-O-(p-nitrophenyl)phosphorothioate A typical formulation is given below, as well as a method of using it.

| | Percent |
|---|---|
| 5,5'-thiobis(3-chloro-4-isothiazolecarbonitrile) | 50 |
| Partially desulfonated sodium lignin sulfonate | 3 |
| Dioctyl ester of sodium sulfosuccinic acid | 3 |
| Synthetic fine silica | 44 |

This wettable powder composition is prepared by blending the above ingredients and then ball-milling or otherwise suitably micropulverizing until all particles have an average diameter of 10 microns or below, preferably 2 microns or below. The ingredients are then reblended.

For use, this composition is then diluted with water to give a concentration of ¾ lb. of active ingredient per 100 gallons. The resulting suspension is then sprayed to run-off on apple trees at weekly intervals during periods when apple scab fungus (*Venturia inaequalis*) might attack the foliage and/or fruit. This regime protects the trees and fruit from infection by apple scab organisms.

This application is a continuation-in-part of coassigned, copending application Serial No. 191,308, filed April 30, 1962, now U.S. Patent 3,118,901.

Since obvious modifications and equivalents in the invention will be apparent to those skilled in the chemical arts, I propose to be bound solely by the appended claims.

The embodiments of the invention in which an exclusive property or privilege is claimed are defined as follows:

I claim:

1. A compound of the formula

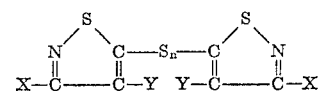

wherein n is 1–2, X is a halogen of atom number 17–35, and Y is of the group consisting of —CN, —CONH₂ and —COOH.

2. 5,5'-thiobis(3-chloro-4-isothiazolecarbonitrile).
3. 5,5'-thiobis(3-chloro-4-isothiazolecarboxamide).
4. 5,5'-dithiobis(3-chloro-4-isothiazolecarbonitrile).
5. 5,5'-dithiobis(3-chloro-4-isothiazolecarboxamide).
6. A process of preparing a member of the group consisting of a 5,5'-thiobis(3-X-4-isothiazolecarbonitrile) and a 5,5' - thiobis(3-X-4-isothiazolecarboxamide) which comprises reacting a compound of the formula

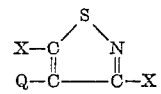

where X is a halogen of atomic number 17–35, and Q is of the group consisting of —CN and —CONH₂, with an alkali metal thiocyanate of the formula MSCN, where M is an alkali metal of atomic number 11–19, at a temperature of about 0° C.–150° C. in an inert organic medium which is at least a partial solvent for said compound and thiocyanate, thereby preparing a 5,5'-thiobis(3-X-4-isothiazolecarbonitrile) when Q is —CN and a 5,5'-thiobis(3-X-4-isothiazolecarboxamide) when Q is —CONH₂.

7. A process of preparing a 5,5'-thiobis(3-X-4-isothiazolecarbonitrile) which comprises reacting a 3,5-dihalo-4-isothiazolecarbonitrile of the formula

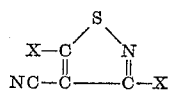

where X is a halogen of atomic number 17–35, with an alkali metal thiocyanate of the formula MSCN, where M is an alkali metal of atomic number 11–19, at a temperature of about 0° C.–150° C. in an inert organic medium which is at least a partial solvent for said carbonitrile and thiocyanate.

8. The process of claim 7 wherein X is chlorine.
9. The process of claim 7 wherein the temperature is 50° C.–100° C.

No references cited.